(12) United States Patent
Mitchell et al.

(10) Patent No.: US 11,654,383 B2
(45) Date of Patent: May 23, 2023

(54) FILTER ASSEMBLY FOR ICE MAKING APPLIANCE

(71) Applicant: Haier US Appliance Solutions, Inc., Wilmington, DE (US)

(72) Inventors: Alan Joseph Mitchell, Louisville, KY (US); Stephanos Kyriacou, Louisville, KY (US); Brent Alden Junge, Evansville, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 278 days.

(21) Appl. No.: 17/103,142

(22) Filed: Nov. 24, 2020

(65) Prior Publication Data

US 2022/0161165 A1   May 26, 2022

(51) Int. Cl.
*B01D 35/30* (2006.01)
*B01D 15/36* (2006.01)
*B01D 15/22* (2006.01)
*C02F 1/00* (2023.01)
*C02F 1/42* (2023.01)
*F25C 5/182* (2018.01)

(52) U.S. Cl.
CPC ............. *B01D 35/30* (2013.01); *B01D 15/22* (2013.01); *B01D 15/362* (2013.01); *B01D 15/363* (2013.01); *C02F 1/003* (2013.01); *C02F 1/42* (2013.01); *F25C 5/182* (2013.01); *B01D 2201/29* (2013.01); *B01D 2201/342* (2013.01); *B01D 2201/4061* (2013.01); *C02F 2001/422* (2013.01); *C02F 2001/425* (2013.01); *C02F 2201/004* (2013.01); *C02F 2201/006* (2013.01); *C02F 2307/12* (2013.01)

(58) Field of Classification Search
CPC ...... B01D 35/30; B01D 15/22; B01D 15/362; B01D 15/363; B01D 2201/29; B01D 2201/342; B01D 2201/4061; B01D 24/18; B01D 2201/24; B01D 2201/296; C02F 1/003; C02F 1/42; C02F 2001/422; C02F 2001/425; C02F 2001/004; C02F 2001/006; C02F 2307/12; C02F 2301/028; F25C 5/182; F25C 1/18; F25C 2400/14; F25D 2323/121

See application file for complete search history.

(56) References Cited

U.S. PATENT DOCUMENTS

| 3,744,263 A | 7/1973 | Corley |
| 5,289,691 A | 3/1994 | McDougal |

(Continued)

FOREIGN PATENT DOCUMENTS

| CN | 1555286 A | * 12/2004 | ........... B01D 35/143 |
| EP | 2730546 A1 | * 5/2014 | ........... B01D 24/007 |

(Continued)

*Primary Examiner* — Emmanuel E Duke
(74) *Attorney, Agent, or Firm* — Dority & Manning, P.A.

(57) ABSTRACT

A filter cartridge assembly for an ice making appliance having a rectilinear filter cartridge with a plurality of partitions that are positioned within an internal chamber, form multiple sub-chambers, and create a non-linear pathway for the flow of water through the filter cartridge. Filter media positioned in the sub-chambers of the filter cartridge are configured to remove dissolved solids from water travelling through the filter cartridge and used by the appliance to create ice, including clear ice.

19 Claims, 9 Drawing Sheets

(56) References Cited

U.S. PATENT DOCUMENTS

| | | | | |
|---|---|---|---|---|
| 5,342,518 A | * | 8/1994 | Posner | B01D 65/00 210/232 |
| 5,651,887 A | * | 7/1997 | Posner | B01D 35/147 210/232 |
| 6,153,105 A | | 11/2000 | Squier | |
| 6,926,826 B2 | * | 8/2005 | Reid | B01D 35/303 285/376 |
| 7,067,054 B2 | | 6/2006 | Fritze | |
| 8,756,950 B2 | | 6/2014 | Brunner | |
| 9,303,903 B2 | | 4/2016 | Boarman et al. | |
| 10,274,238 B2 | | 4/2019 | Mitchell | |
| 2016/0376172 A1 | * | 12/2016 | Ellers | C02F 1/463 204/660 |
| 2018/0128530 A1 | | 5/2018 | Mitchell | |
| 2018/0207305 A1 | | 7/2018 | Almblad | |
| 2019/0257565 A1 | | 8/2019 | Broadbent | |

FOREIGN PATENT DOCUMENTS

| | | | | |
|---|---|---|---|---|
| JP | 2001289542 A | | 10/2001 | |
| JP | 3665260 B2 | | 6/2005 | |
| JP | 2009095823 A | * | 5/2009 | A01K 63/045 |
| JP | 4400068 B2 | | 1/2010 | |
| WO | WO2007068506 A1 | | 6/2007 | |
| WO | WO2008061179 A2 | | 5/2008 | |

* cited by examiner

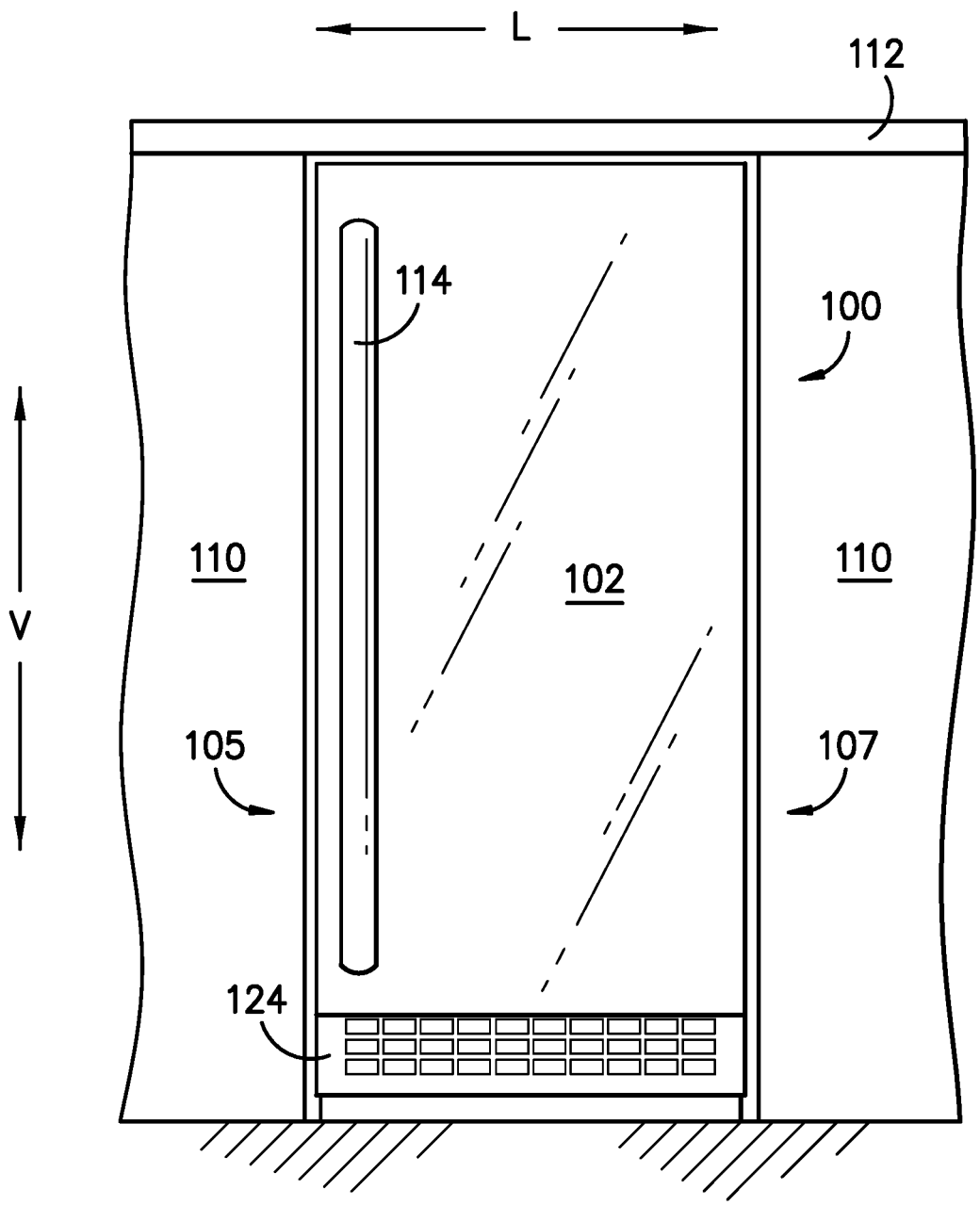
FIG. -1-

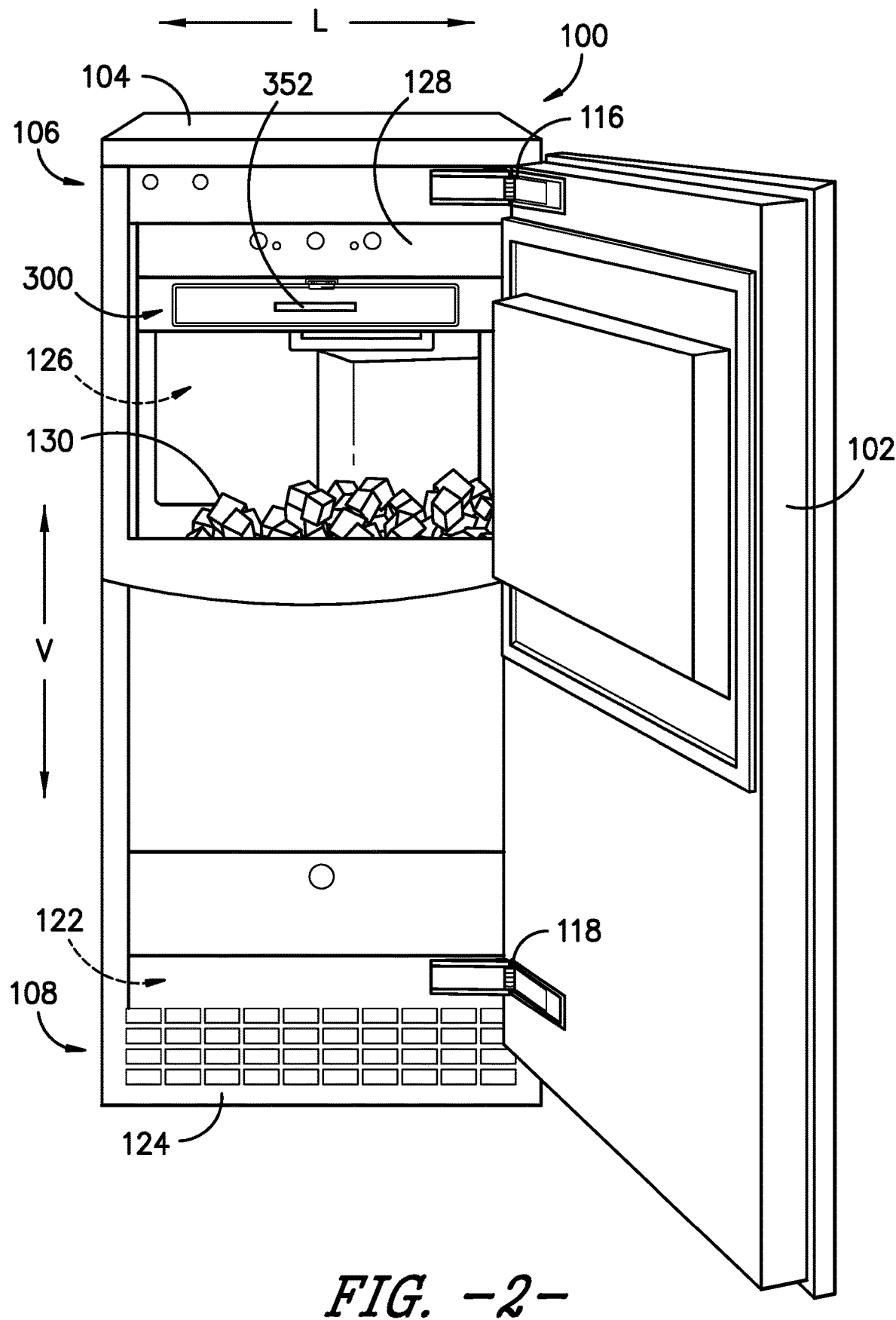
FIG. -2-

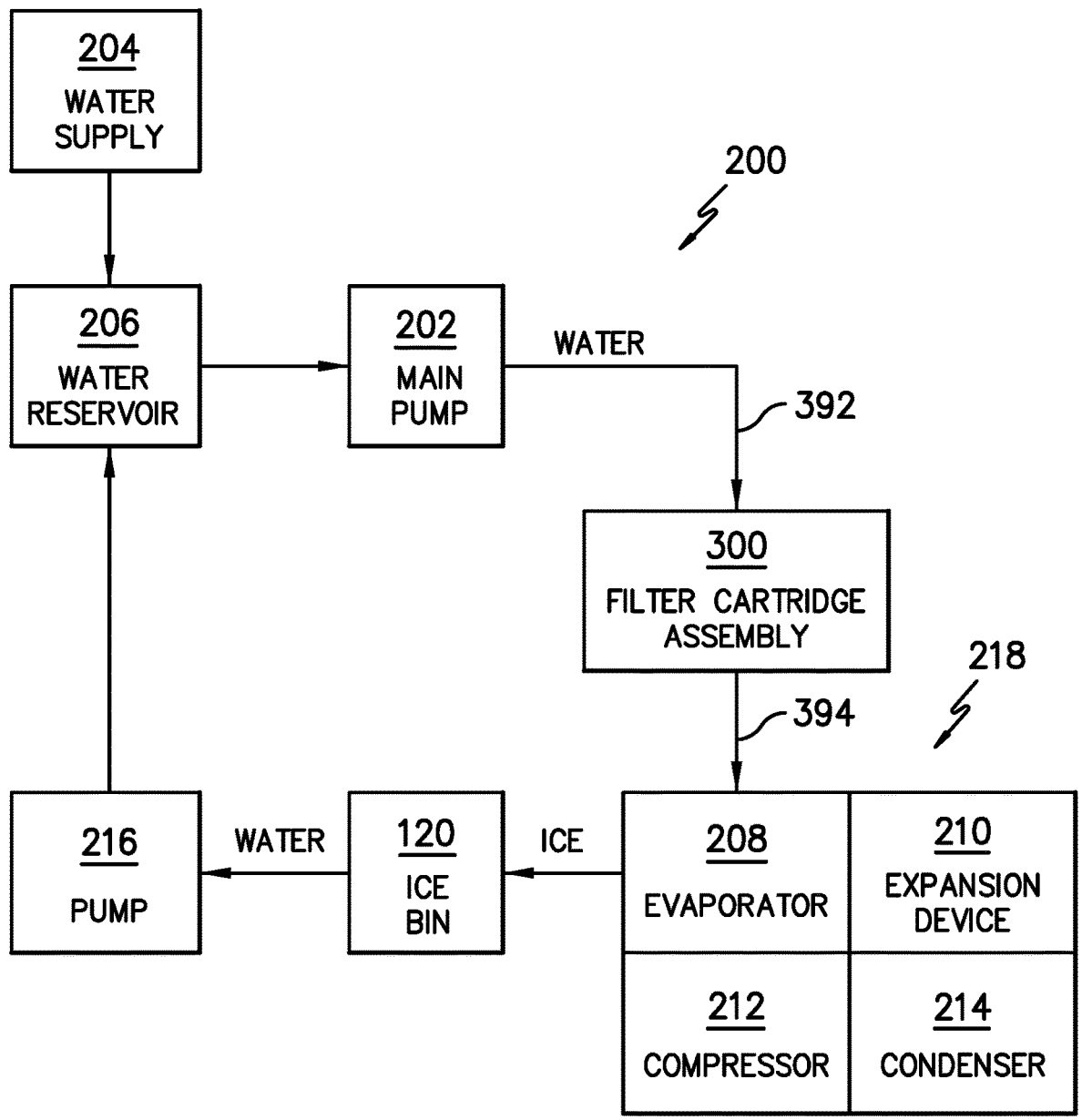
FIG. -3-

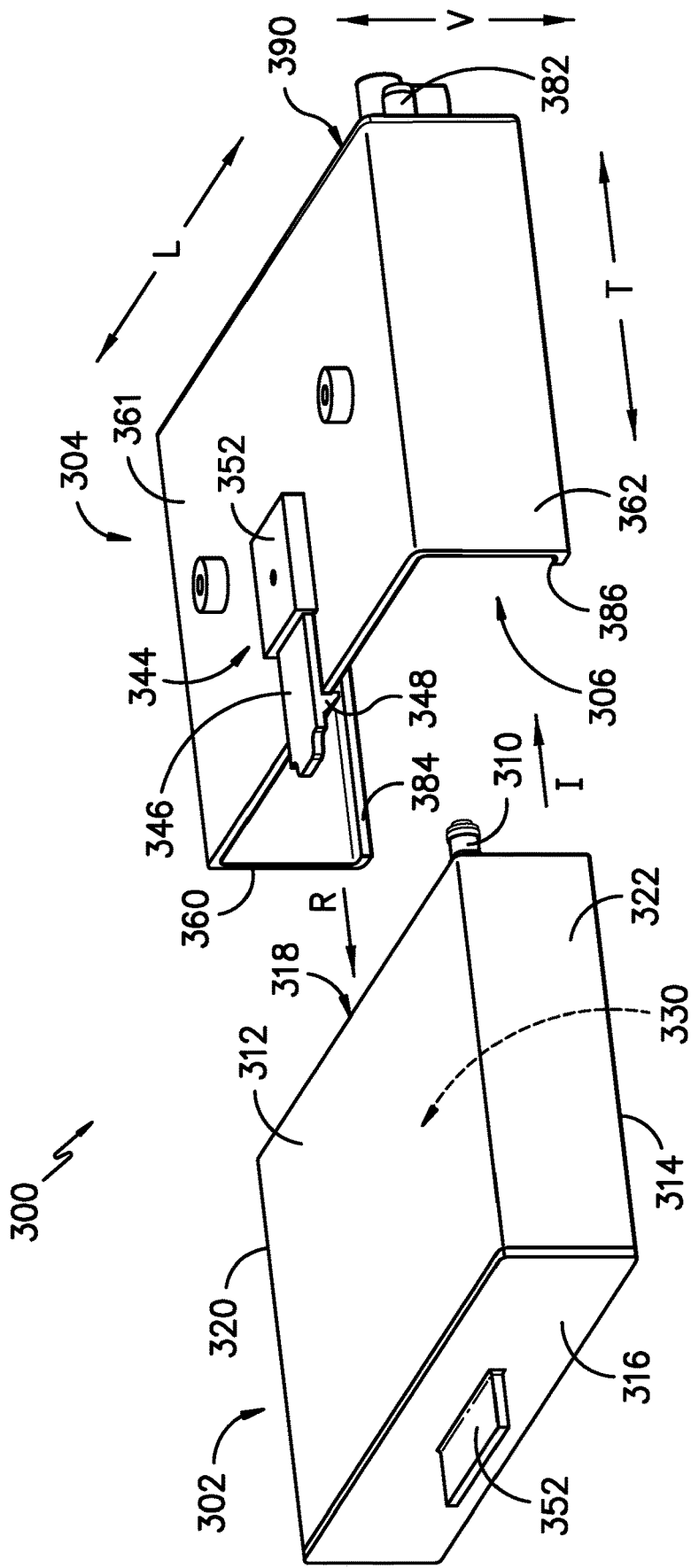

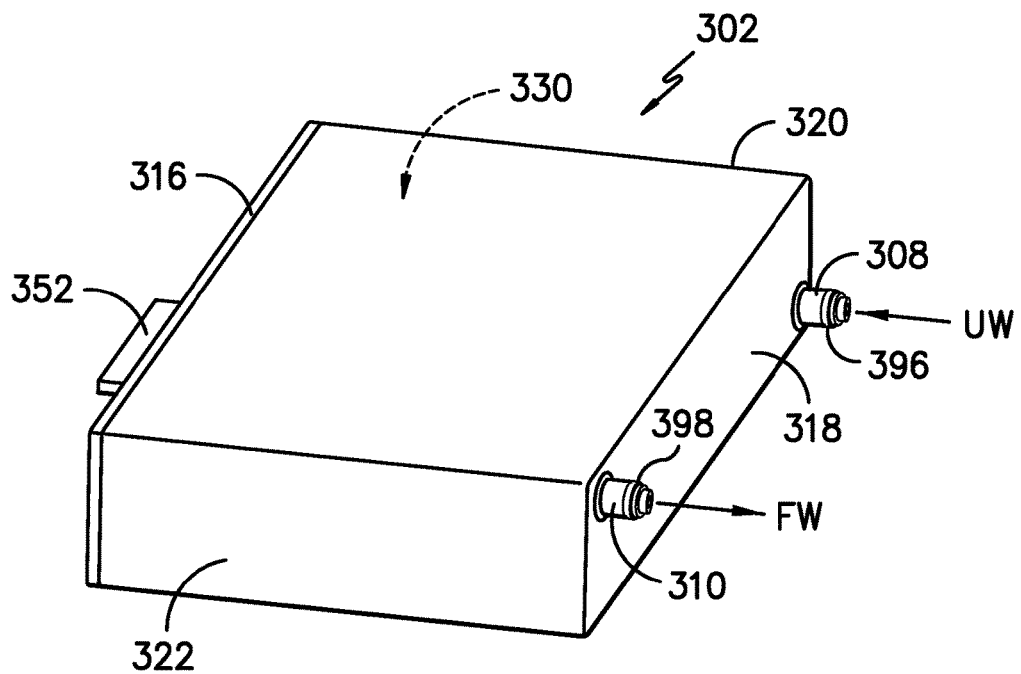
FIG. -5-
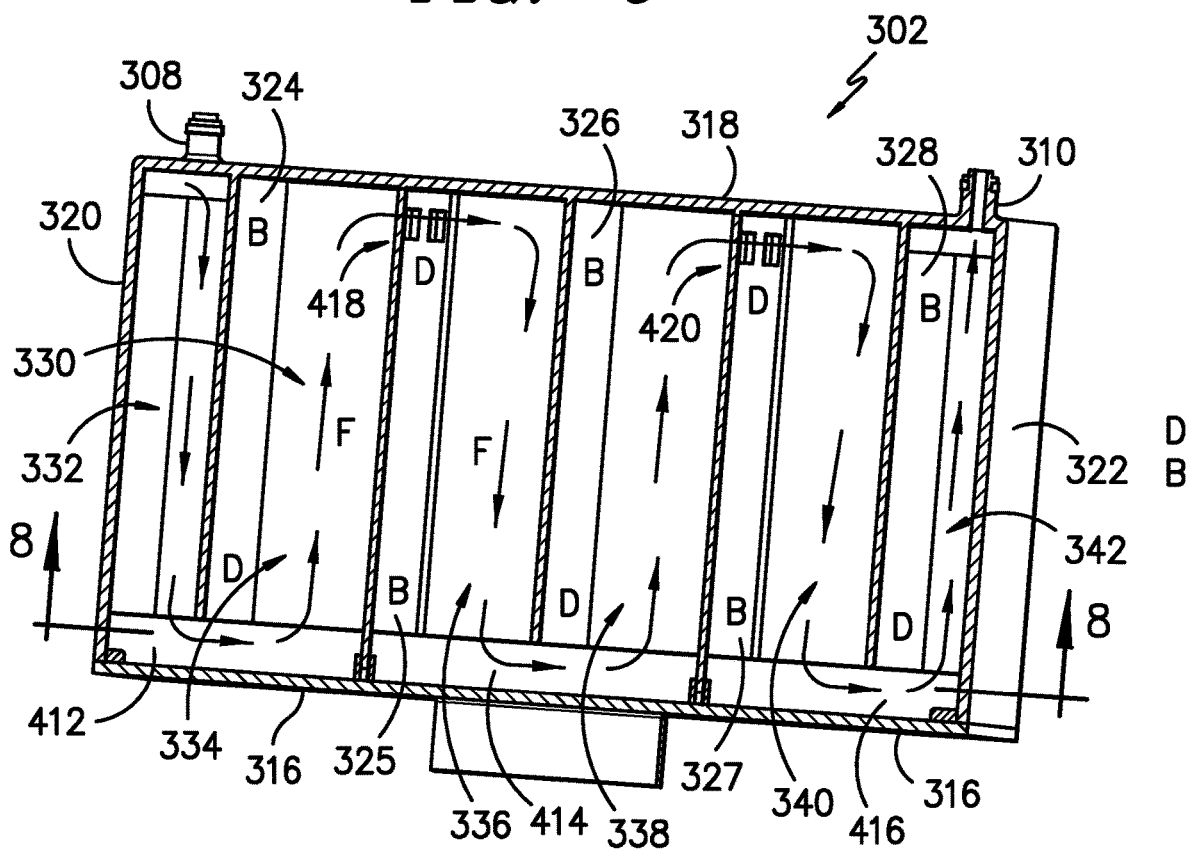
FIG. -6-

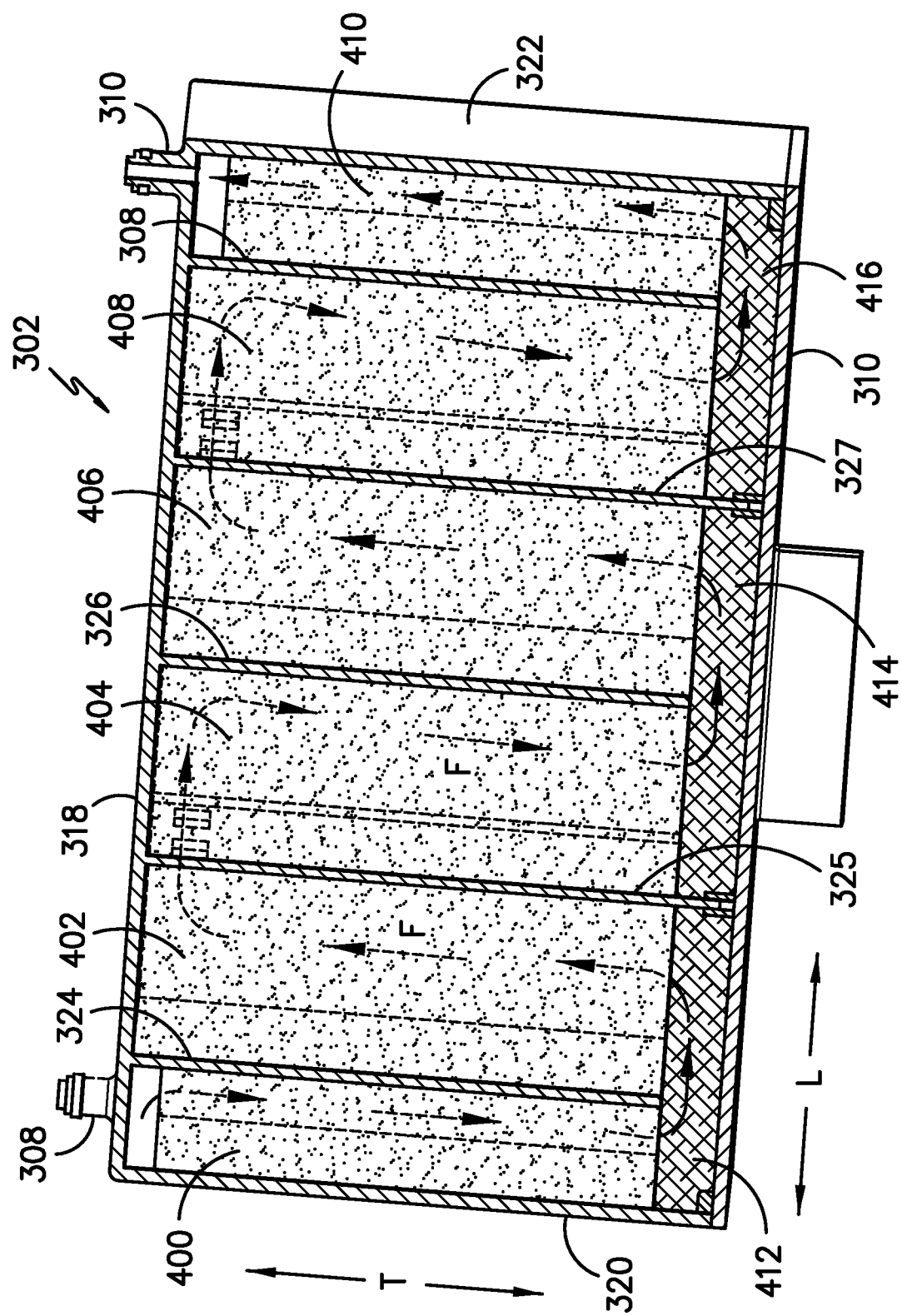
FIG. -7-

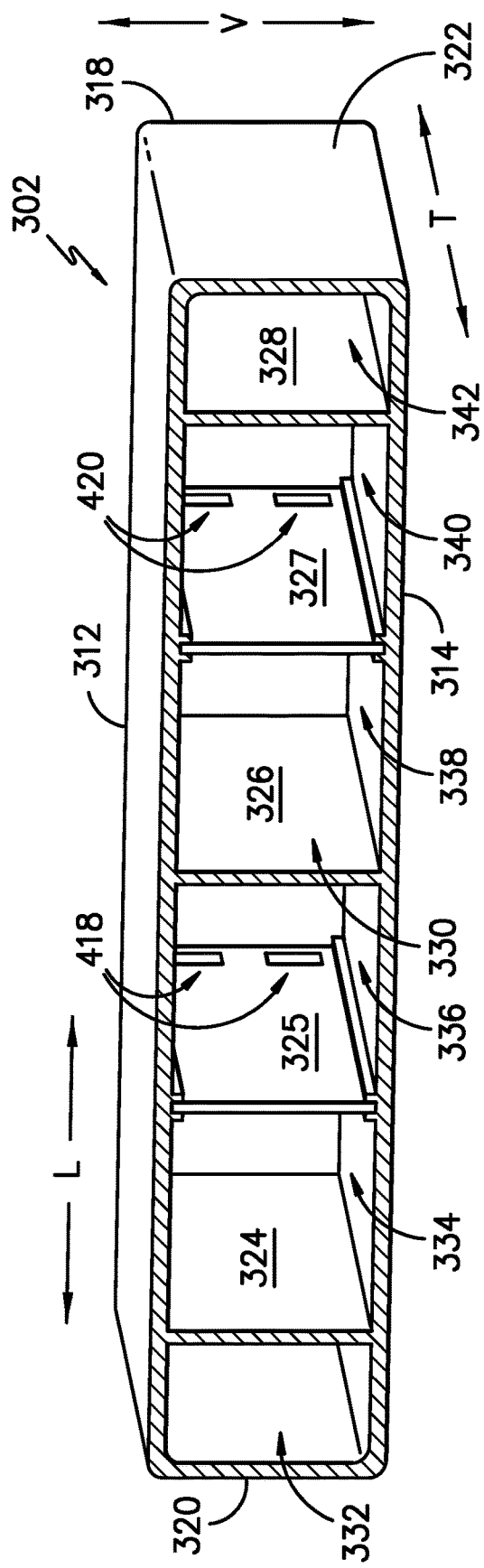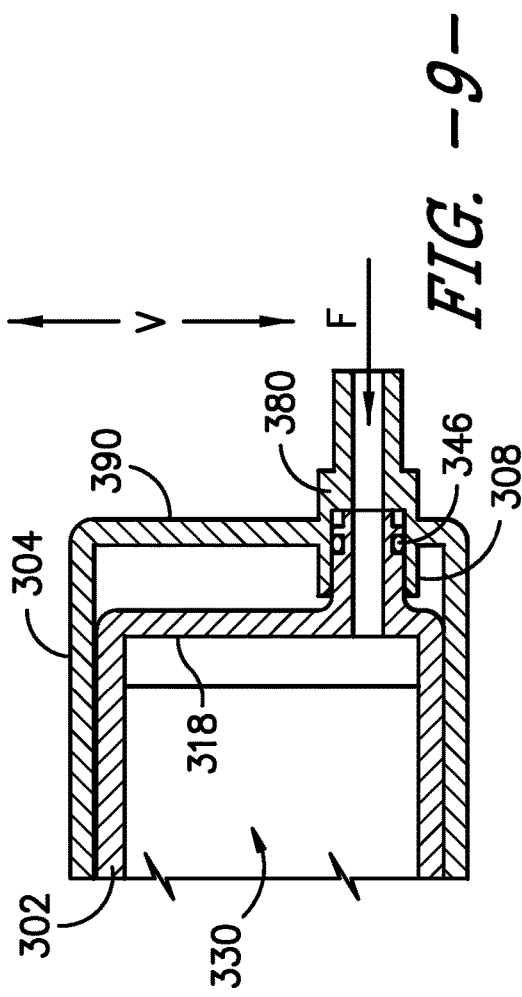

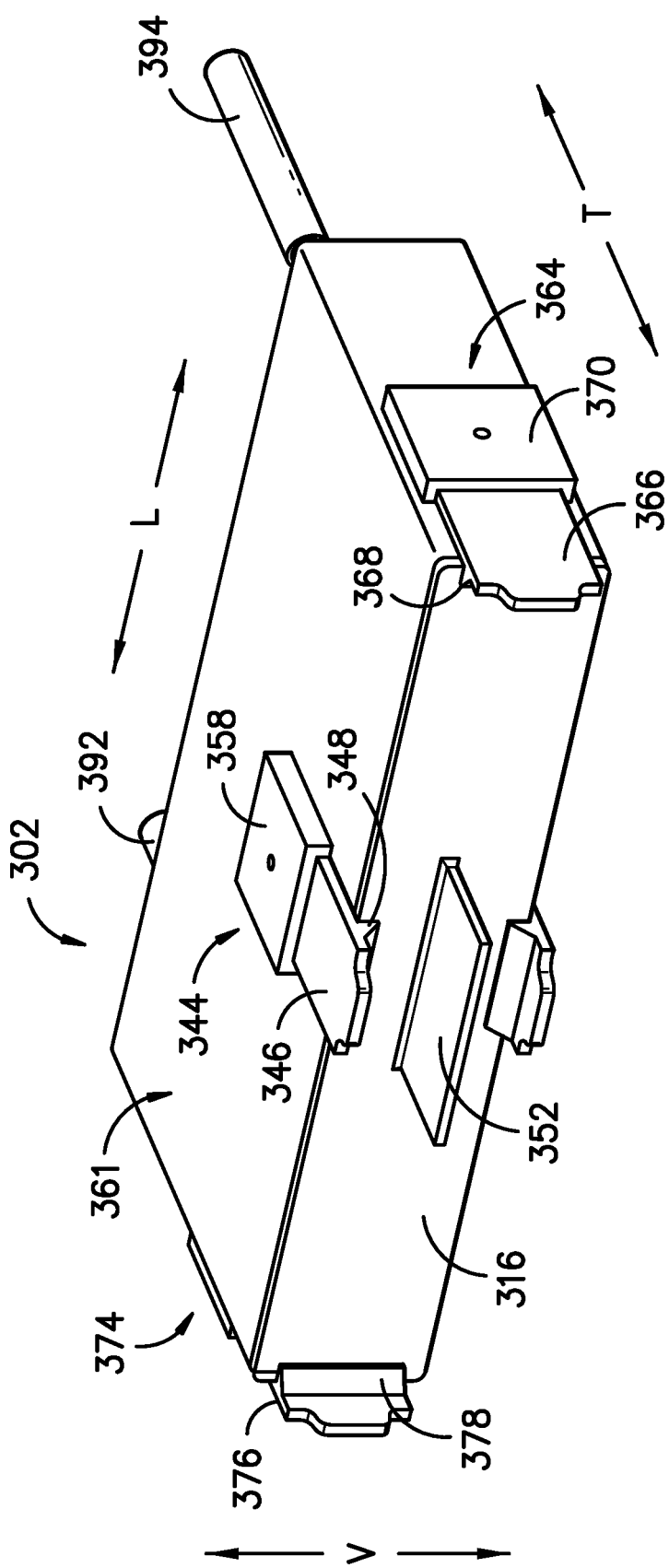

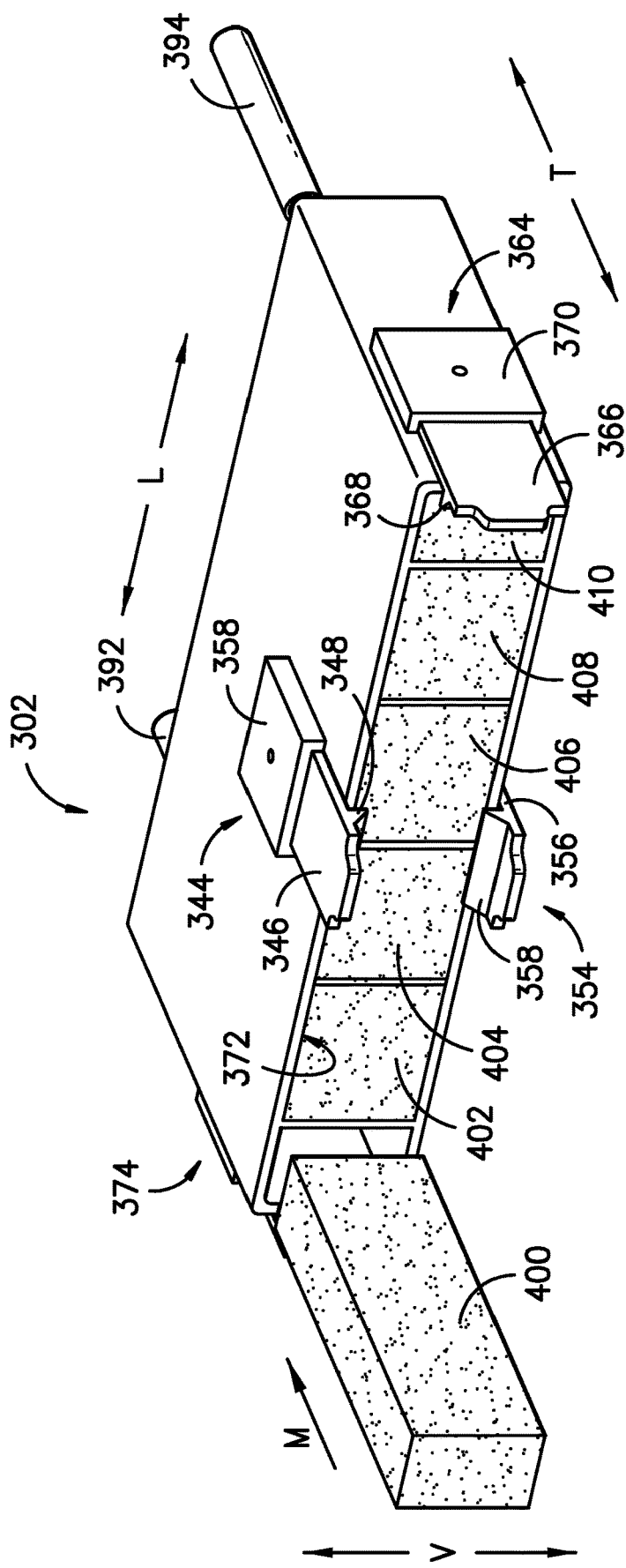
FIG. -11-

FILTER ASSEMBLY FOR ICE MAKING APPLIANCE

FIELD OF THE INVENTION

The subject matter of the present disclosure relates generally to a deionization filter for an ice making appliance including a clear ice making appliance.

BACKGROUND OF THE INVENTION

Appliances that create ice provide a convenience in both commercial and residential applications. Ice may be used in liquid refreshments as well as food preparation and storage. Having an appliance that can be supplied with water to create and store ice may ensure such is readily available as needed and thereby avoid transport and storage of the same. The ice making appliance may be a stand-alone appliance or may be incorporated into another appliance such as refrigerator that includes a freezer compartment and/or an additional compartment dedicated to ice production.

"Clear ice" can be very desirable to certain consumers, particularly for use in liquid refreshments. As used herein, "clear ice" refers to ice that has been formed by an appliance through a process that reduces or eliminates air bubbles, particles, and dissolved solids in the ice so as create ice that is more transparent or clear for the passage of light as compared to ice formed by traditional or conventional processes. For example, ice can be formed by freezing water that has been poured into a receptacle. Air trapped in the resulting ice along with any particles and dissolved solids will increase the opacity of the ice. In contrast, the manufacture of clear ice may include filtering the water to remove particles and dissolved solids and then freezing the water in a manner that avoids trapping air in the ice as it forms. The resulting ice can be relatively clearer or more transparent than ice made without taking such steps and may also melt more slowly. For at least these reasons, certain consumers desire appliances that can provide such clear ice.

The manufacture of ice, and particularly clear ice, can consume significant amounts of water. For example, the ice making appliance may flow circulate water over an evaporator to chill the water into ice. Dissolved solids in the water will accumulate in each pass as the ice is formed and removed. In order to prevent the solids from precipitating and depositing on the evaporator, water is drained from the appliance and replaced with fresh water having a lower concentration of dissolved solids. The process is repeated resulting in a significant consumption of water that is not converted into ice.

In order to reduce the amount of dissolved solids, the water may be filtered. However, particulate filters may not remove dissolved solids. Additionally, conventional filters may consume valuable space that would more preferably be used for storage of the ice and/or other components of the ice making appliance. Limitations on available space may be particularly acute for stand-alone ice making appliances that are intended for convenient placement within a small space in cabinetry and/or under a countertop. Such appliances are already more compact relative to e.g., a refrigerator such that the addition of a filter may be impractical due to space constraints.

Accordingly, a device for filtering water for the manufacture of ice would be desirable. More particularly, a device for filtering water and removing dissolved solids in an appliance for manufacturing clear ice would be particularly useful. Such a device that can provide the desired amount of filtration while reducing the amount of space consumed by the filter in the appliance would also be particularly useful. An ice making appliance incorporating such a device would be useful. Such an appliance that can reduce or eliminate the amount of water used in making the ice would be particularly desirable.

BRIEF DESCRIPTION OF THE INVENTION

Additional aspects and advantages of the invention will be set forth in part in the following description, or may be apparent from the description, or may be learned through practice of the invention.

In one exemplary embodiment, the present invention provides a filter cartridge assembly for an ice making appliance. A filter cartridge thereof can define an internal chamber, the filter cartridge having a pair of generally parallel main walls separated by the internal chamber and connected by a first pair of end walls and a second pair of side walls. A fluid inlet is connected with the filter cartridge and provides for the flow of water into the internal chamber. A fluid outlet is connected with the filter cartridge and providing for the flow of filtered water out of the internal chamber.

A plurality of partitions may be positioned within the internal chamber, extending between the parallel main walls to form multiple sub-chambers, each partition defining a blocked end and an open end, the partitions spaced apart along a direction between the end walls to form a first group where the blocked end is connected to one of the side walls and a second group where the blocked end is connected with the other side wall. The partitions may define a non-linear pathway for the flow of water through the filter cartridge between the fluid inlet and the fluid outlet. Filter media is positioned in the sub-chambers of the filter cartridge. The filter media can be configured to remove dissolved solids from water travelling through the filter cartridge.

In another exemplary embodiment, the present invention provides an ice making appliance and includes a cabinet defining an interior. A door is supported by the cabinet and is configured for allowing selective access to the interior. An ice bin can be located within the interior of the cabinet and positioned to collect ice created by the ice making appliance. A cooling system is provided for converting water from a liquid to ice. A filter cartridge assembly provides for removing dissolved solids from the water. The filter cartridge assembly can include a filter cartridge having a rectilinear shaper and defining an internal chamber, the filter cartridge having a pair of generally parallel main walls separated by the internal chamber and connected by a first pair of end walls and a second pair of side walls. A fluid inlet is connected with the filter cartridge and provides for the flow of fluid into the internal chamber. A fluid outlet is connected with the filter cartridge and provides for the flow of fluid out of the internal chamber.

A plurality of partitions may be positioned within the internal chamber and extending between the parallel main walls to form multiple sub-chambers. The partitions are configured to form a serpentine pathway for the flow of water through the filter cartridge between the fluid inlet and the fluid outlet. Filter media is positioned in the sub-chambers of the filter cartridge. The filter media is configured to remove dissolved solids from water travelling through the filter cartridge.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a front view of an exemplary embodiment of an ice making appliance of the present invention installed in cabinetry.

FIG. 2 is another front view of the exemplary embodiment of an ice making appliance shown in FIG. 1 with a door shown in an open position to reveal the interior of the appliance.

FIG. 3 is a schematic diagram illustrating an exemplary ice production system as may be used in the ice making appliance of FIGS. 1 and 2.

FIG. 4 is an exploded view of an exemplary filter cartridge assembly of the present invention.

FIG. 5 is a perspective view of an exemplary filter cartridge as may be used in the exemplary assembly of FIG. 4.

FIGS. 6 and 7 are perspective views of the filter cartridge of FIGS. 4 and 5. For purposes of illustration, the filter media is not shown in FIG. 6 and a top wall has been removed in FIGS. 6 and 7.

FIG. 8 is another perspective view of the exemplary filter cartridge of the previous figures with a side wall removed and the filter media not shown for purposes of illustration.

FIG. 9 is a partial cross-sectional view of the exemplary filter cartridge assembly of the previous figures.

FIG. 10 is a perspective view of another exemplary embodiment of the present invention.

FIG. 11 is a perspective, partial cross-sectional view of the exemplary embodiment of FIG. 10.

Use of the same or similar reference numerals denotes the same or similar features unless otherwise noted.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 and 2 provide front views of an exemplary embodiment of an ice making appliance 100 of the present invention. As shown in FIG. 1, ice making appliance 100 is installed in a cabinet 110 under a countertop 112 as might be found in residential or commercial applications. For this exemplary embodiment, ice making appliance 100 will be described with a deionization filter cartridge assembly 300 for making clear ice. However, in other exemplary embodiments, the present invention may provide water filtration for an ice making machine within another appliance such as a refrigerator that stores food items and may also be used for manufacturing regular ice as well as clear ice.

Ice making appliance 100 includes a cabinet 104 defining an interior 126 where ice 130 is created and stored in an ice bin 120 for ready access by a user. Ice bin 120 may include a hinged front door for ready access to the ice 130. Cabinet 104 extends between a top portion 106 and a bottom portion 108 along vertical direction V and between a left side 105 and right side 107 as viewed in FIG. 1 along lateral direction L. A transverse direction T (e.g., FIG. 4) is orthogonal to both vertical direction V and lateral direction L and together the three define an orthogonal coordinate system.

Appliance 100 includes a front door 102 that can be supported by cabinet 104 and configured for allowing a user to open door 102 and selectively access interior 126 while also insulating interior 126 to conserve energy when closed. For this embodiment, door 102 is pivotably supported on hinges 116 and 118. Other configurations and shapes for cabinet 104 and door 102 may be used as well.

A control panel 128 (FIG. 2) is included in the top portion 106 of appliance 100. Control panel 128 may include dials, buttons, or other features whereby a user may select various options for the operation of appliance 100. A filter cartridge assembly 300 is also conveniently located in top portion 106 adjacent to control panel 128 and will be further described herein. Assembly 300 includes a handle 352 allowing the user to conveniently access and replace a filter cartridge 302 and/or filter media (FIG. 4) located therein. Other locations and orientations for filter cartridge assembly 300 may also be used. A machinery compartment 122 is located in bottom portion 108 of appliance 100 behind grille 124.

FIG. 3 provides a schematic illustration of an exemplary clear ice production system 200 for the creation of ice as may be used with appliance 100. The operation of exemplary ice production system 200 will now be described. Using the teachings disclosed herein, one of ordinary skill in the art will understand that other ice production systems may be used within the scope of the present invention and claims that follow.

Water is provided to ice production system 200 from water supply 204 external to appliance 100 and may be e.g., a municipal or well-water supply associated with the commercial or residential application in which appliance 100 is installed. The water can be fed into a reservoir 206 located in ice making appliance 100 and from which main pump 202 draws water and supplies the same to filter cartridge assembly 300. The pressure at which water is supplied to filter cartridge assembly 300 from pump 202 may be relatively low. For example, while the pressure of external water supply may range from 35 pounds per square inch (psi) to 120 psi, the non-zero pressure of water provided by pump 202 at filter cartridge assembly 300 may be 10 psi or less, 5 psi or less, or in the range x where $0 \leq x \leq 10$ psi. This can provide advantages in the design of filter cartridge assembly 300 as will be further described.

The contents of water from supply 204 may vary considerably depending upon the geographic location, the amount and type of water treatment applied to supply 204 before use in appliance 100, and other variables as well. For example, the pH, alkalinity, turbidity and other properties may vary dramatically. In the production of clear ice, as previously referenced, dissolved solids present in water supply 204 can be detrimental to the creation of clear ice having the desired level of clarity or transparency. Such dissolved solids may be present even if the water provided from supply 204 to reservoir 206 was previously filtered or otherwise treated.

Accordingly, filter cartridge assembly 300 provides for the reduction and/or removal of dissolved solids from water provided from water supply 204. As used herein, the term "water" includes potable water that may not be pure H₂O and instead may include other potable substances including particles and dissolved solids.

Continuing with FIG. 3, after filtration to removed e.g., dissolved solids, the filtered water is cooled by a refrigeration or cooling system 218 to at, or below, the freezing temperature of water (0° C. or 32° F.) using an evaporator 208. By way of example, refrigeration system 218 may be a sealed system that includes components for executing a known vapor compression cycle to provide cooling in ice maker 100. The components can include evaporator 208, expansion device 210, compressor 212, and condenser 214—all connected in a loop that is charged with a refrigerant. As will be understood by those skilled in the art, such sealed system 218 may include additional components, e.g., at least one additional evaporator, compressor, expansion device, and/or condenser. Thus, cooling or refrigeration system 218 is provided by way of example only. It is within the scope of the present subject matter for other configurations of a refrigeration or cooling system to be used as well.

Within cooling system 218, refrigerant flows into compressor 212, which operates to increase the pressure of the refrigerant. This compression of the refrigerant raises its temperature, which is lowered by passing the refrigerant through condenser 214. Within condenser 214, heat exchange with ambient air takes place so as to cool the refrigerant. A fan may operate to move air through grille 124 and across condenser 214 so as to provide forced convection for a more rapid and efficient heat exchange between the refrigerant within condenser 214 and the ambient air. The expansion device (e.g., a valve, capillary tube, or other restriction device) receives refrigerant from condenser 214. From the expansion device, the refrigerant enters evaporator 208. Upon exiting the expansion device and entering evaporator 208, the refrigerant drops in pressure. Due to the pressure drop and/or phase change of the refrigerant, evaporator 208 is cool, e.g., relative to ambient air and/or liquid water. Evaporator 208 is positioned in thermal contact with water from filter cartridge assembly 300. For example, water may be sprayed onto, or caused to flow across, evaporator 208. The water is cooled and undergoes a phase change to ice 130, which is stored in ice bin 120.

Within ice bin 120, the clear ice 130 may melt and the resulting water/condensate is collected and returned by a secondary pump 216 to water reservoir 206. From there, the water/condensate may be mixed with water from supply 204 and the cycle just described repeated for the creation of clear ice. One exemplary advantage of the filter cartridge system 300 of the present invention is that it allows for the substantial reduction or removal of dissolved solids in water supply 204. Because of this high efficiency, ice production system 200 is a drainless ice production system in one exemplary embodiment of the invention.

As used herein, "drainless ice production system" means that water is not drained from system 200. In prior known systems, a certain amount of water fed to system 200 from supply 204 would be drained into a waste line instead of being consumed as ice. This is necessary to prevent the precipitation of dissolved solids on e.g., evaporator 208. Water would be drained so that additional water can be added to not only replace what is removed through ice consumption but also to dilute water in the appliance and prevent the precipitation of dissolved solids—particularly onto evaporator 208. As stated, in one exemplary embodiment as shown in FIG. 3, ice production system 200 is drainless in that no water must be removed due to the level of filtration of dissolved solids provided by filter cartridge assembly 300. Ice production system 200 is provided by way of example only. One of ordinary skill in the art will understand that other ice production systems may be used with the filter cartridge assembly 300 of the present invention in other embodiments of the invention.

FIG. 4 illustrates an exemplary embodiment of filter cartridge assembly 300 with a filter cartridge 302 removed from a filter manifold 304 for purposes of illustration. Filter manifold 304 defines a slot 306 for the insertion (arrow I) and removal (arrow R) of filter cartridge 302 therefrom. As such, for this exemplary embodiment, filter cartridge 302 can be readily replaced by the user by accessing the interior 126 of cabinet 104 and pulling cartridge 302 out using handle 352. A new cartridge 302 can be similarly inserted. During insertion and removal, cartridge 302 can slide back and forth in transverse direction T along a pair of opposing guides 384, 386 spaced apart from each other along lateral direction L.

Filter manifold 304 includes a latch mechanism 344 for releasably securing filter cartridge 302 within filter manifold 304. Latch mechanism 344 includes a resilient latch arm 346 supported on a top wall 361 of manifold 304 and extending away from manifold 304 as shown. Latch arm 346 includes a stop 348 extending orthogonally from latch arm and positioned to selectively block the removal of filter cartridge 302 from filter manifold 304. The user can lift latch arm 346 to provide for convenient removal of filter cartridge 302 and replacement when needed.

Referring now to FIGS. 4 through 9, filter cartridge 302 is rectilinear in shape and defines an internal chamber 330 that is divided into a plurality of sub-chambers 332, 334, 336, 336, 340, and 342 (FIG. 6) into which filter media 400, 402, 404, 406, 408, and 410 (FIG. 7) has been placed, respectively. As shown, the sub-chambers are also rectilinear in shape. Filter cartridge 302 includes a pair of generally parallel and opposing main walls 312 and 314 separated from each other along vertical direction V by chamber 330 for this exemplary embodiment. As used herein, "generally parallel" means forming an angle of 2 degrees or less from each other. Main walls 312 and 314 are connected by i) a first pair of opposing end walls 320 and 322 separated along lateral direction L by chamber 330 and ii) a second pair of opposing side walls 316 and 318 separated along transverse direction T by chamber 330. Sidewall 316 includes handle 352. In one exemplary embodiment, the low pressure of unfiltered water UW (FIG. 6) provided to filter cartridge 302 allows for the rectilinear shape. This shape in turn allows to more effective filtration (as compared to cylindrical filters required for higher pressure) because increased contact between the water and filter media in a more compact space can be provided.

Filter cartridge assembly 300 includes a fluid inlet 308 connected with filter cartridge 302 and a fluid outlet 310 also connected with the filter cartridge. As shown in FIG. 6, fluid inlet 308 provides a connection for the flow of unfiltered water (arrow UW) into internal chamber 330 and fluid outlet 310 provides a connection for the flow of filter water (arrow FW) out of internal chamber 330. Fluid inlet 308 and fluid outlet 310 are each provided with an O-ring seal 396 and 398 (FIG. 5), respectively. Other types of seals may also be used.

On rear wall 390 (cross-sectional view in FIG. 9), filter manifold 304 includes a fluid inlet socket 380 and also includes a similar fluid outlet socket 382 (FIG. 4). As shown by way of example in FIG. 9, fluid inlet socket 380 releasably receives fluid inlet 308 into socket 380 when filter cartridge 302 is inserted into filter manifold 304 and is sealed by O-ring 396. Similarly, fluid outlet socket 382 releasably receives fluid outlet 310 into socket 382 when filter cartridge 302 is inserted into filter manifold 304 and is sealed by O-ring 398. Other types of connections may also be utilized with the scope of the present invention. Fluid inlet socket 380 and fluid outlet socket 382 can be connected with a water line-in 392 and a water line-out 394 (FIG. 3).

Continuing with reference to FIGS. 6, 7, and 8, a plurality of partitions 324, 325, 326, 327, and 328 are positioned within internal chamber 300 and divide it into the sub-chambers 332, 334, 336, 338, 340, and 342. Each partition extends orthogonally to, and between, main walls 312 and 314. For this embodiment, the partitions are parallel to each other and orthogonal to sidewalls 316 and 318. With reference to the passage of water through the filter cartridge 302, each partition defines a blocked end B where fluid is precluded from passage and an open end O where fluid is allowed to pass. The arrangement of the partitions, including the blocked and open ends, creates a non-linear and, more particularly, serpentine path for the passage of fluid (arrows F) through chamber 330 between fluid inlet 308 and fluid outlet 310.

Specifically, the partitions include a first group of partitions 324, 326, and 328 that each have a blocked end B that is connected to side wall 318 of cartridge 302. The other end O of each of the first group of partitions 324, 326, and 328 is not connected to side wall 316. Instead, a small gap exists between open end O and side wall 316 where porous media portions 412, 414, and 416 are positioned. For example, porous media portions may be constructed of a non-woven fibrous pad that allows for the passage of water (arrows F) between adjacent sub-chambers while preventing the passage or movement of filter media 400, 402, 404, 406, 408, and 410 positioned in sub-chambers 332, 334, 336, 338, 340, and 342, respectively (FIG. 7). Accordingly, water may pass around the open end O of partitions 324, 328, and 328 but is precluded from flowing around blocked ends B. Other types of porous media portions may also be used.

The partitions includes a second group of partitions 325 and 327 that have a blocked end B that is connected to side wall 316 of filter cartridge 302. The other end O of each of the second group of partitions 325 and 327 is connected to side wall 318. The second end O of partitions 325 and 327 includes apertures 418 and 420, respectively, defined by partitions 325 and 327, and through which water may flow between adjacent sub-chambers while simultaneously restricting the movement of filter media therebetween. In one exemplary embodiment, partitions 325 and 326 are also removable from filter cartridge 302 whereas partitions 324, 326, and 328 are integrally formed with filter cartridge 302. A different number of partitions and sub-chambers may be used in other embodiments of the invention.

In one exemplary embodiment, the filter media contained in filter cartridge 302 includes one or more deionization resins that remove dissolved solids from the water as it flows (arrows F) through filter cartridge 302 between fluid inlet 308 and fluid outlet 310 so as to enable the production of clear ice. The filter media may be constructed from both anion resins and cation resins in the form of beads. For example, filter media 400, 402, 404, 406, 408, and 410 may be alternated between a cation resin and an anion resin along lateral direction L. Optionally, each such media may include a mixed-bed media of both cation resin and anion resin. By way of example, the resins may be constructed from polymer beads that remove various mineral ions from the water as is flows through cartridge 302. Other filter media for removing dissolved solids, particulates, and/or other contaminants may be used as well.

As mentioned, the rectilinear shape and partitioned configuration of filter cartridge 302 desirably provides for high efficiency filtration of e.g., dissolved solids while also providing a filter than can be readily fitted within the limited space of appliance 100. In addition, filter cartridge assembly 300 can be conveniently located so that the user can readily remove and replace cartridge 302 and/or the filter media as needed when e.g., filter media 400, 402, 404, 406, 408, and 410 is consumed or spent. Although shown in an orientation in FIG. 2 where the main walls 314 and 314 are oriented horizontally, one of ordinary skill in the art will understand that other orientations and locations within appliance 100 may also be used within the spirit and scope of the present invention and claims that follow.

Additionally, the present invention includes other embodiments, an example of which is shown in FIG. 10. For this exemplary embodiment, filter cartridge assembly does not include a manifold 304. Instead, fluid inlet 308 and 310 are connected directly with water lines 392 and 394. For this embodiment, side wall 316 is configured as a door having handle 352 for the removal of wall 316 from the front of cartridge 302 (compare FIGS. 10 and 11). A seal can be provided between side wall 316 and the front surface 372 (FIG. 11) of filter cartridge 302 to prevent the leakage of water. The user can remove wall 316 and individually replace filter media 400, 402, 404, 406, 408, and 410 in sub-chambers 332, 334, 336, 338, 340, and 342 as denoted by arrow M for filter media 400. The internal construction and flow of water through cartridge 302 is otherwise as described with reference to the embodiments of FIGS. 4 through 8. One or more latch mechanisms 344, 354, 364, and 374 with latch arms 346, 356, 366, and 376 equipped with stops 348, 358, 368, and 378 operating as previously described may be used as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter cartridge assembly for an ice making appliance, comprising:
   a filter cartridge defines an internal chamber, the filter cartridge having a pair of generally parallel main walls separated by the internal chamber and connected by a first pair of end walls and a second pair of side walls;
   a fluid inlet connected with the filter cartridge and providing for the flow of water into the internal chamber;
   a fluid outlet connected with the filter cartridge and providing for the flow of water out of the internal chamber;
   a plurality of partitions positioned within the internal chamber, extending between the parallel main walls to form multiple sub-chambers, each partition defining a blocked end and an open end, the partitions spaced apart along a direction between the end walls to form a first group where the blocked end is connected to one of the side walls and a second group where the blocked end is connected with the other side wall, and wherein the partitions define a non-linear pathway for the flow of water through the filter cartridge between the fluid inlet and the fluid outlet; and filter media positioned in the sub-chambers of the filter cartridge, the filter media configured to remove dissolved solids from water travelling through the filter cartridge.

2. The filter cartridge assembly for the ice making appliance as in claim 1, further comprising a filter manifold defining a slot for removable insertion of the filter cartridge.

3. The filter cartridge assembly for the ice making appliance as in claim 2, wherein the filter manifold further comprises a latch mechanism for releasably securing the filter cartridge within the filter manifold.

4. The filter cartridge assembly for the ice making appliance as in claim 3, wherein the latch mechanism comprises a resilient latch arm supported on a wall of the filter manifold and extending away from the filter manifold, the latch arm including a stop extending orthogonally from the latch arm and positioned to selectively block the filter cartridge from removal from the filter manifold.

5. The filter cartridge assembly for the ice making appliance as in claim 3, wherein the latch mechanism comprises a pair of resilient latch arms, each latch arm supported on one of the main walls and extending away from the filter manifold, each latch arm including a stop extending orthogonally from the latch arm and positioned to selectively block the filter cartridge from removal from the filter manifold.

6. The filter cartridge assembly for the ice making appliance as in claim 2, further comprising a filter manifold defining
a slot for removable insertion of the filter cartridge;
a fluid inlet socket for releasable receipt of the fluid inlet of the filter cartridge; and
a fluid outlet socket for releasable receipt of the fluid outlet of the filter cartridge.

7. The filter cartridge assembly for the ice making appliance as in claim 6, wherein the fluid inlet and the fluid outlet of the filter cartridge each include an O-ring type seal for mating with the fluid inlet socket and the fluid outlet socket, respectively, to prevent leaking of water.

8. The filter cartridge assembly for the ice making appliance as in claim 1, further comprising a plurality of porous media portions, each porous media portion positioned at one of the open ends of the first group of partitions to allow water to flow through the sub-chambers of the filter cartridge along the non-linear pathway while separating filter media between adjacent sub-chambers.

9. The filter cartridge assembly for the ice making appliance as in claim 8, wherein the porous media portions comprise non-woven fiber pads.

10. The filter cartridge assembly for the ice making appliance as in claim 1, wherein the first group of partitions are connected to only one of the side walls and the second group of partitions are connected to both of the sides walls.

11. The filter cartridge assembly for the ice making appliance as in claim 10, wherein each partition of the second group of partitions defines at least one aperture within the partition for the flow of water.

12. The filter cartridge assembly for the ice making appliance as in claim 1, wherein the filter media comprises a cation resin and an anion resin removed dissolved solids from the water.

13. An ice making appliance, comprising
a cabinet defining an interior;
a door supported by the cabinet and configured for allowing selective access to the interior;
an ice bin located within the interior of the cabinet and positioned to collect ice created by the ice making appliance;
a cooling system for converting water from a liquid to ice;
a filter cartridge assembly for removing dissolved solids from the water, the filter cartridge assembly comprising
a filter cartridge having a rectilinear shape and defining an internal chamber, the filter cartridge having a pair of generally parallel main walls separated by the internal chamber and connected by a first pair of end walls and a second pair of side walls;
a fluid inlet connected with the filter cartridge and providing for the flow of water into the internal chamber;
a fluid outlet connected with the filter cartridge and providing for the flow of water out of the internal chamber;
a plurality of partitions positioned within the internal chamber and extending between the parallel main walls to form multiple sub-chambers, the partitions configured to form a serpentine pathway for the flow of water through the filter cartridge between the fluid inlet and the fluid outlet; and
filter media positioned in the sub-chambers of the filter cartridge, the filter media configured to remove dissolved solids from water travelling through the filter cartridge.

14. The ice making appliance as in claim 13, further comprising a filter manifold defining a slot for removable insertion of the filter cartridge.

15. The ice making appliance as in claim 14, wherein the filter manifold further comprises a latch mechanism for releasably securing the filter cartridge within the filter manifold.

16. The ice making appliance as in claim 15, wherein the latch mechanism comprises a resilient latch arm supported on one of the main walls and extending away from the filter manifold, the latch arm including a stop extending orthogonally from the latch arm and positioned to selectively block the filter cartridge from removal from the filter manifold.

17. The ice making appliance as in claim 16, wherein the latch mechanism comprises a pair of resilient latch arms, each latch arm supported on one of the main walls and extending away from the filter manifold, each latch arm including a stop extending orthogonally from the latch arm and positioned to selectively block the filter cartridge from removal from the filter manifold.

18. The ice making appliance as in claim 17, wherein the filter manifold further comprises:
a fluid inlet socket for releasable receipt of the fluid inlet of the filter cartridge; and
a fluid outlet socket for releasable receipt of the fluid outlet of the filter cartridge.

19. The filter cartridge assembly for an ice making appliance as in claim 18, wherein the fluid inlet and the fluid outlet of the filter cartridge each include an O-ring type seal for mating with the fluid inlet socket and the fluid outlet docket, respectively, to prevent leaking of water.

* * * * *